UNITED STATES PATENT OFFICE.

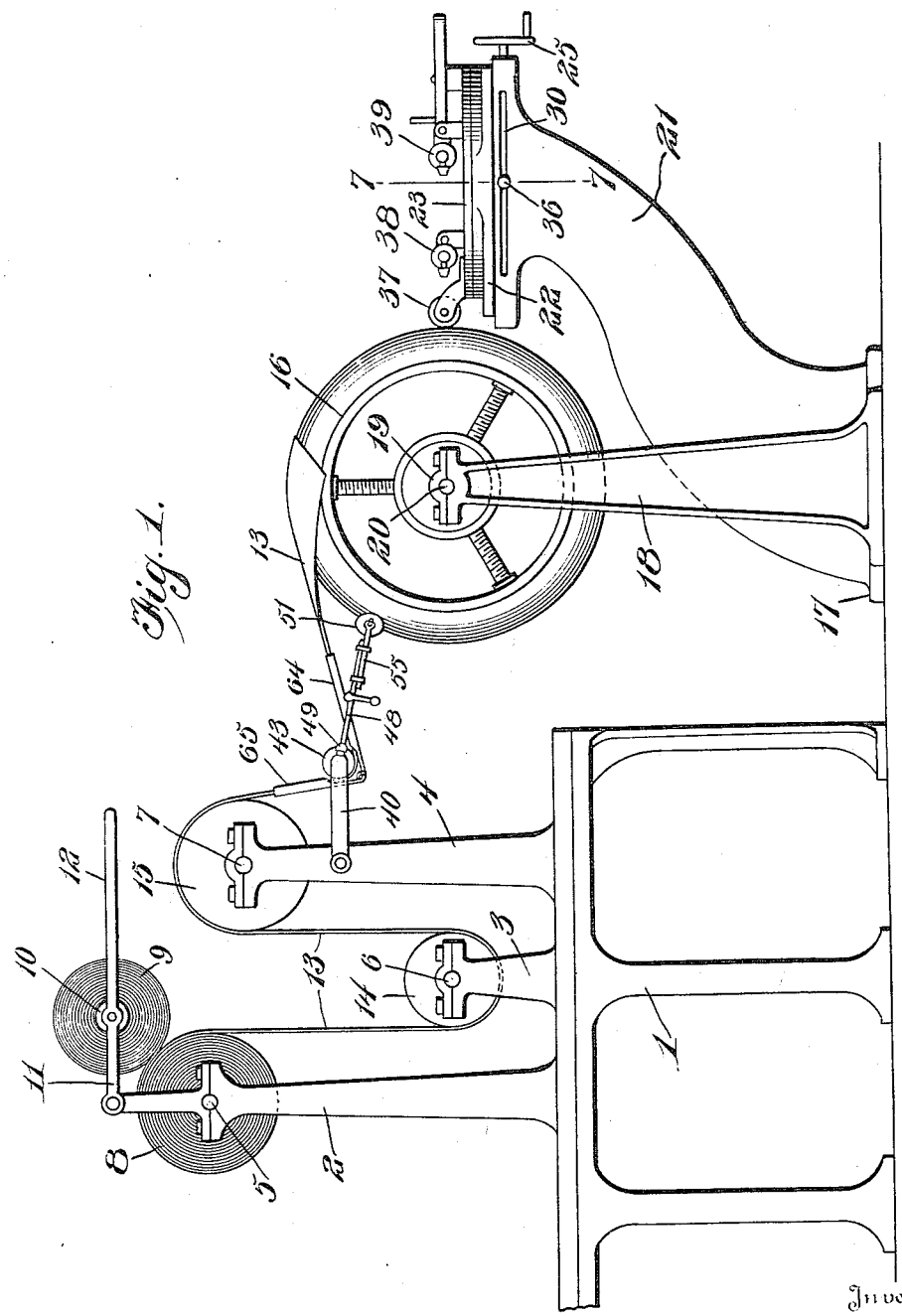

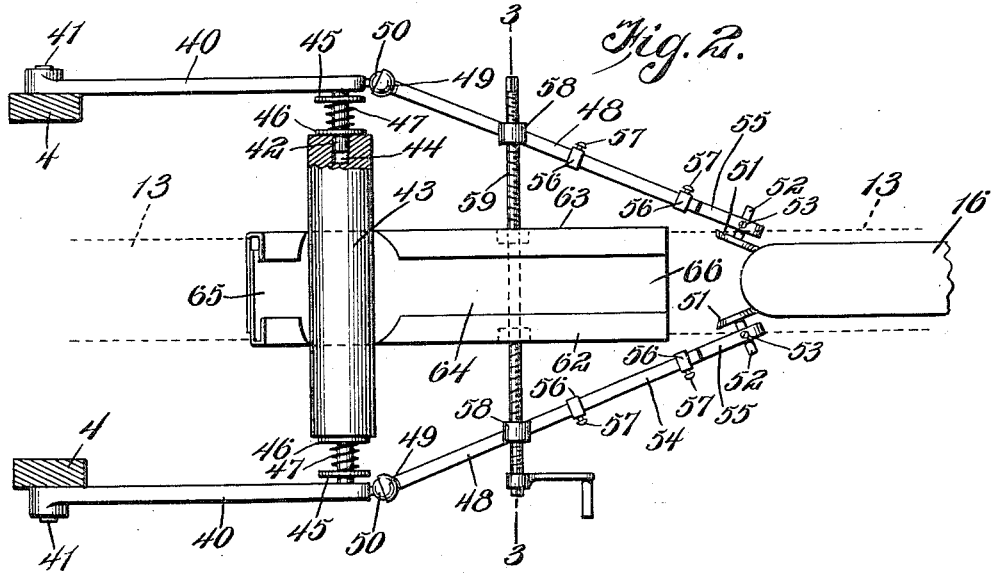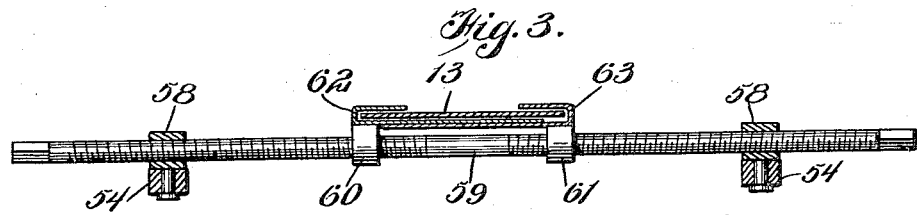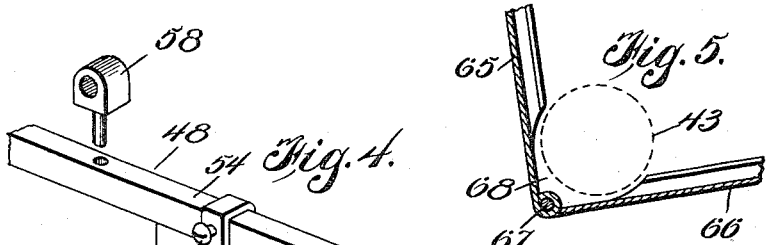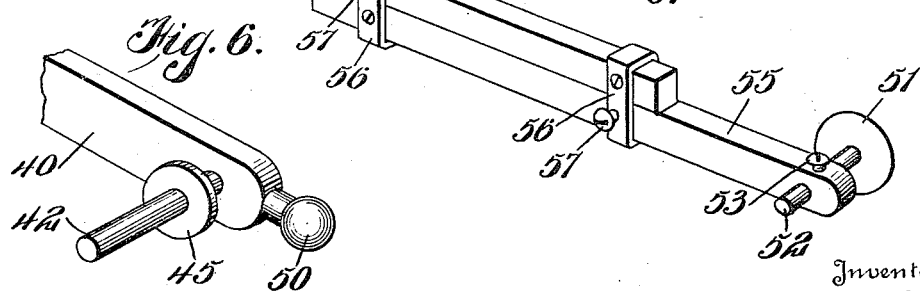

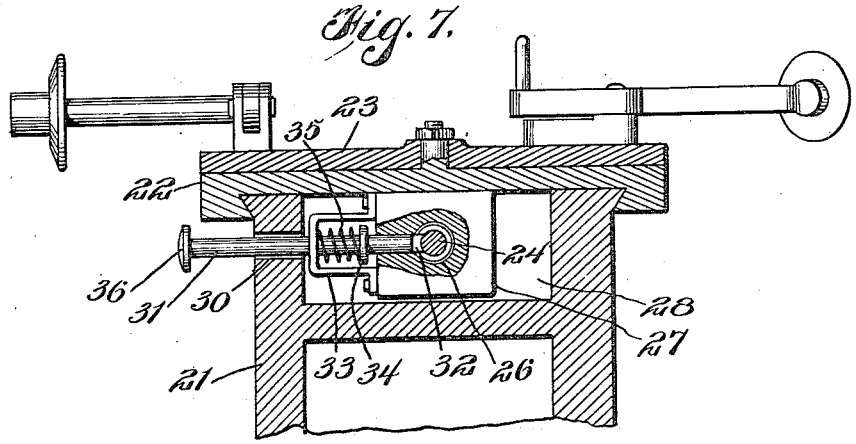
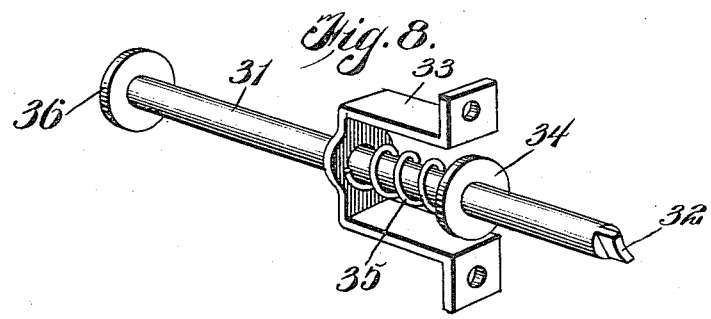
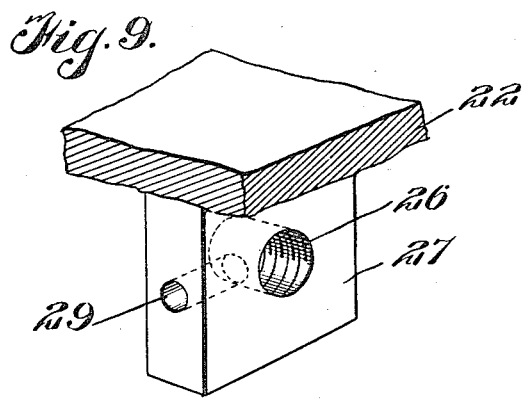

MARION B. WHEELER, OF NEW YORK, N. Y.

TIRE-BUILDING MACHINE.

1,266,364.      Specification of Letters Patent.      Patented May 14, 1918.

Application filed June 2, 1917. Serial No. 172,442.

*To all whom it may concern:*

Be it known that I, MARION B. WHEELER, a citizen of the United States, residing at New York, in the county of New York and State of New York, have invented new and useful Improvements in Tire-Building Machines, of which the following is a specification.

This invention relates to improvements in tire building machines of that type in which layers or strips of rubberized sheet fabric are successively wrapped about or built up around a rotary ring core for the production of the body of a tire-shoe or casing, which is subsequently subjected to finishing treatment to complete its formation.

One object of the invention is to provide means for guiding the layers or strips of rubberized fabric from the supply and tensioning rolls to the ring core, and properly tensioning such layers or strips and disposing the same with relation to the forming surface of the core, whereby an accurate feeding action is obtained, the strips at all times disposed to accurately conform to the surface of the core and to obviate the necessity of using oversized strips, while preventing or materially reducing waste of time and material due to the necessity of trimming.

Another object of the invention is to provide fabric guiding and tensioning means of the character described which is adapted for guiding fabric strips of different widths, as required in the production of tires of the same or various sizes, and which is adapted to guide the fabric in its movements to accurately conform to any irregularities or variations which may exist in the shape or conformation of various ring cores in connection with which the tire fabric guiding and tensioning devices may be used.

A still further object of the invention is to provide a building machine whereby time, labor and material in the building of tires may be saved, and better and more uniformly made tires produced.

A still further object of the invention is to provide a builder carriage which is adapted to be manipulated to effect saving in time and labor in the coasting actions or forward and backward movements of said carriage, during the operation of building a tire.

With these and other objects in view, the invention consists of the features of construction, combination and arrangement of parts, hereinafter fully described and claimed, reference being had to the accompanying drawings, in which:—

Figure 1 is a side elevation of so much of a tire building machine as is necessary to illustrate my invention, showing the invention applied for use in connection with the usual supply and tensioning rolls, ring core and carriage.

Fig. 2 is a top plan view, partly in section, of my improved fabric guiding and tensioning means.

Fig. 3 is an enlarged section taken on the line 3—3 of Fig. 2.

Fig. 4 is a perspective view of one of the movable and extensible arms of the controlling means for supporting and adjusting the channeled guide.

Fig. 5 is a vertical longitudinal section through the channeled guide.

Fig. 6 is a perspective view of one of the bracket arms for supporting the final guiding and tensioning or delivery roll.

Fig. 7 is a section through the carriage taken on the line 7—7 of Fig. 1.

Fig. 8 is a perspective view of the bolt for locking the traveler nut to the feed screw of the carriage and releasing said nut to permit quick forward movement or retraction of the carriage.

Fig. 9 is a perspective view of a portion of the carriage and the traveler nut.

Referring to the drawings, 1 designates a main frame carrying sets of uprights 2, 3 and 4, provided with bearings for the shafts 5, 6 and 7. The shaft 5 carries a supply roll 8 of the sheet fabric, which is the rubberized fabric commonly employed, which fabric is covered or protected on one side by a protective strip of muslin 9. As the rubberized fabric feeds from the roll 8 to the tire forming core for use, the muslin protective layer 9 is stripped therefrom and wound around a stripping or take up roll 10 carried by a suitable frame 11 pivotally mounted upon the uprights 2 and provided with a lever 12. The roll 10 and its covering of the protective material 9 taken up thereby bears by gravity upon the face of the roll 8, and thus acts as a gravity friction pressure device to hold the roll 8 from rotation until the rubberized material is positively drawn upon for a feeding action. The roll 9 may be manually raised clear of the roll 8, whenever desired, through the medium of the lever arm 12.

The free end of the rubberized sheet material is extended from the roll 8 in the form of a feeding strip 13 which passes from the roll of material 8 to an intermediate guide roll 14 mounted on the shaft 6, thence forwardly and upwardly around said roll 14 to a secondary guide roll 15 carried by the shaft 7, and from said roll 15 to the rotary forming core 16. The roll 14 is to arrange below the plane of the rolls 5 and 15, the strip 13 being arranged in the form of a loop between the said rolls, whereby it is properly tensioned on its feeding action, but it is to be understood that suitable additional tensioning devices may be employed if desired. For the purpose of defining the function of the roll 15, the said roll may be termed a delivery roll of a primary series of supply or guiding rolls in that the strip of material passes over this roll prior to its passage to the novel guiding means constitutive of my invention on its way to the forming core. The fabric supporting and guiding means constructed and arranged as thus far described may be the same as that commonly employed, or of any equivalent construction.

Arranged at one side of the main frame 1 is a base 17 carrying uprights 18 having bearings 19 for the axle 20 of the rotary forming core 16. This rotary core may be of any ordinary construction, and may be of a fixed size or diameter for the formation of a tire of any given size, or composed of adjustable segments which may be interchangeably used to vary the diameter of the core as required for the formation of tires of different sizes. The core 16 may be either hand operated or power driven through suitable mechanism embodying low speed gearing for driving the core at slow speed while a layer of rubberized fabric or bead is being applied and high speed gearing for driving the core at a higher speed or speeds for stitching down plies, side shaping or forming trimming and other similar operations, as is customary in the manufacture of built up tires. The base 17 carries a stand on which is slidably mounted a carriage 22 supporting a rotary bed or table 23 on which the various tools for shaping, trimming or otherwise treating the tire are mounted, which are mounted at points around the table and may be brought into operative position by rotating the table on its axis. The tool is then moved forward to working position by an advancing motion of the carriage and moved backward to normal position by retracting the carriage.

In the operation of making a tire the carriage must be moved backward and forward a number of times, which is ordinarily accomplished by means of screw feed mechanism which is slow in operation, and, on account of the number of movements required, consumes a considerable amount of the operator's time within the normal period allowed for applying a tire of any given diameter. In order to enable these operations of advancing and retracting the carriage to be accelerated, with a saving of time and labor. I provide a novel feed mechanism comprising a screw shaft 24 provided with the usual hand wheel 25 and which extends through a bore or passage 26 in a feed block 27, fixed to the carriage, and which takes the place of the usual feed nut. This block 27 is disposed within a chamber or compartment 28 in the stand 21 and is formed with an opening 29 extending at right angles through one of its sides and intersecting the passage 26. Slidably mounted in this opening 29 and in a guide opening 30 in one side of the chamber 28 is a locking pin or bolt 31 having one or more teeth or projections 32 at its inner end to engage the threads of the screw shaft 24. The bolt or pin also slidably engages a U-shaped bracket 33 mounted upon the block 27 and between which and a head or abutment 34 fixed thereto is a coiled spring 35 acting to hold the bolt or pin normally pressed inward to engage the block 27 with the shaft 24 for a feeding motion. The outer end of the bolt or pin is provided with a knob or head 36 serving as a finger piece whereby the operator may readily and conveniently slide the bolt outward for retraction to disengage the tooth 32 from the screw shaft. It will thus be seen that normally the carriage is coupled to the feed screw for a forward or backward feeding action, but that the operator may at any time disconnect the carriage from the feed screw for manually moving the carriage forwardly or backwardly at accelerated speed. Thus, while the carriage may be moved backward or forward for precise adjustment by the operator through the usual screw feed mechanism, whenever required, it is obvious that the operator may at any time disconnect the carriage from the screw shaft for a quick action movement forward or backward, thus saving time and labor in the adjustment of the carriage to move the working tools into and out of working position as required. In the present instance I have shown the rotary table or platform of the carriage provided with the central tread forming roll or rolls 37, spinning or side forming or shaping rolls 38, and bead attaching rolls 39, in addition to which cutters of suitable type for trimming the edges of the plies or layers of material may be employed. I have not deemed it necessary to show these tools or devices in detail, as they may be of any ordinary or preferred construction and mounted in the ordinary or any other desired manner.

In the art of making tires, layers or strips of different lengths and widths are applied and shaped to form the body of the tire-shoe prior to the application of the breaker strip and the tread forming elements. Heretofore it has been found necessary to make some of the strips of excessive width to enable them to be properly applied, owing to the inaccurate assemblage of the segments of the ring core, and careless or inaccurate guiding and application of the fabric to the core by the workmen, the accurate guiding and application of the fabric being dependent largely upon the experience, skill and care of the workmen, no positive mechanical means being employed to guide the fabric and applying it properly in position. This results in a considerable amount of material being wasted, owing to the amount of material which must be trimmed off. It is one object of my invention to provide means for overcoming these objections by guiding and applying the fabric to the core in an accurate manner, and in such a way as to conform to all variations or inaccuracies in the surface of the core whereby strips of material cut to the exact size may be employed and loss of time and material from trimming and waste prevented.

In carrying my invention into practice for the accomplishment of this result, I provide guiding and applying means between the roll 15 and the ring core 16. This guiding and applying means consists of a frame structure comprising a pair of brackets or frame arms 40 pivoted or otherwise secured at their inner ends, as at 41, to the uprights 4 for swinging movement in a vertical plane. The arms 40 may be the same as heretofore employed to carry a final delivery or guiding roll which is rotatable therein but rigid against shifting movement transversely of and with the fabric. The outer or free ends of these frame arms 40 are provided with bearings for spindles 42 carrying a guide or bending roll 43, which takes the place of an ordinary final delivery or guiding roll above referred to. This roll 43 is disposed at a point in the path of feed of the fabric between the roll 15 and surface of the ring core 16, and in a horizontal plane below the plane of the roll 15 and slightly below the plane of the upper portion of the periphery or forming surface of the core 16. The roll 43 is formed in its end with bearing sockets or recesses 44 slidably receiving the ends of the spindles 42, on which spindles are mounted outer abutment heads or washers 45 and inner sliding abutment heads or washers 46, between which fixed and sliding heads or washers are disposed coiled springs 47 which normally hold the roller 43 in a central position, while permitting it to move longitudinally or laterally with relation to the line of feed of the fabric strip 13. Guiding arms or bars 48 are provided at their inner ends with sockets 49 engaging rounded studs or heads 50 on the free ends of the arms 40, thus forming ball and socket or universally jointed connections between the said guide arms 48 and the frame arms 40 to permit said arms 48 to have vertical and lateral motions with or independent of the arms 40. These arms 48 extend convergently from the arms 40 toward the core 16 and are provided at their free ends with guiding rollers 51 beveled to engage the sides of the forming surface of said core. Each of these guide rollers 51 is mounted for revolution on a spindle 52 adjustably secured to its arm by a set screw 53, whereby said rollers may be adjusted for varying the distance between them to suit tire cores of different widths. Each arm 48 consists of a pair of sliding or telescopic bars or sections 54 and 55 slidably coupled by sleeves 56 provided with clamping screws 57 to fix them relatively in adjusted position, the construction being such as to render the arms 48 adjustable as to length according to the distance between the roller 43 and forming surfaces of the core 16 of different diameters for the production of different sized tires.

The arms 48 are provided with swiveled threaded bearings 58 for a transverely disposed right and left hand threaded adjusting shaft 59, turning in threaded openings in said bearings 58, whereby the arms 48 may be adjusted toward and from each other. The right and left hand threaded portions of the shaft also engage bearings 60 and 61 carried by the sections 62 and 63 of a channeled fabric guide member or director 64. This channeled guide member or director is provided for guiding the fabric strip accurately or on a true and regular line to the surface of the core 16, and is composed of two longitudinally divided sections 62 and 63 whose bottom portions overlap in sliding relation, so that said sections may be adjusted to vary the width of the guide journaled therein, according to the width of the fabric strip 13 which is to be fed to the core 16. It will be observed that in adjusting the sections of the channeled guide or director 54 the guide arms 48 will be correspondingly adjusted to accord with the width of the strip and the width of the tire which is to be formed.

The channeled guide or director 65 is also divided transversely in line with and below the roller 43 to form a rear channeled guide member 65 and a forward relatively longer guide member 66, which guide members are hingedly or pivotally connected at their adjacent edges, as indicated at 67. By this means the portion 65 which guides the strip from the roll 15 to the roll 43 is permitted to stand in a more or less vertical position, while the portion 66 which guides the strip from the roller 43 to the core 16 is permitted to have a more or less horizontal position, while the roller 43 is disposed in the angle between the two sections 65 and 66, to permit the strip 13 on its passage to move freely around the roller 43. The side and top flanges of the channeled section 65 and 66 of the director are cut away to form a space 68 to receive the roller 43, and so as to leave a portion of the fabric strip free from engagement with such flanges while it is passing around said roller, the roller thus being allowed to bend or deflect the fabric to vary its angle of travel without causing the fabric to buckle or stretch, and also without causing the fabric to bind against the flanges and thereby become torn, or otherwise injured. The roller 43 thus serves as a bending or deflecting roll, which at the same time places a desired tension on the fabric to assist in guiding it accurately in its travel to the core 16.

It will thus be understood that the channeled guide or director, which is supported for vertical movements with the arms 40 and 48, and vertical and lateral movements with the arms 48, is preliminarily adjusted with the arms 48 and guide rollers 51 according to the width of the fabric which is to be fed up, and that as the rollers 51 travel in contact with the surface of the core 16 the fabric will be guided to conform to the shape or contour of said surface, as regards any variations or irregularities in the form of the surface at either side thereof. Hence the fabric will be positively guided in its movements and accurately centered or brought into position to be applied to conform to the surface of the core or the tire layers previously placed thereon, so that all irregularities to placing the strip in position will be avoided. Furthermore, owing to the fact that the fabric feeds to the core under the same degree of tension at all times, it will be apparent that the layers of fabric will always be applied with uniformity, neither too loose or under any too great a tension, resulting in the production of uniformly good tires.

In controlling the feed of the strip to the core, the operator may vary the tension of application to a greater or less degree by pressure upon the arms 48 to cause the rollers 51 to engage or bear upon the core with greater or less force, and may also dispose the roller 43 in like manner to regulate its bearing tension on the feeding strip. It will be understood that the cut-out portion or space 68 permits the channeled director and roller 43 to have relative movements in a lateral direction, while the sliding connection between the roller 43 and its spindles permit said roller to shift laterally with the fabric in the lateral movements of the director 64, thus preventing any binding or kinking of the strip on the roller during such adjustment. The frame arms 40 not only support the parts of the guiding means for free movement, but may operate to add their weight to that of the roller 43 to place a desired tension on the fabric. When the guiding mechanism is not used, the front section 66 of the channeled guide and the frame arms 48 may be swung upwardly and rearwardly toward the roller 15 on the pivotal connections 49, 50 and 67, so that the free end of the fabric strip 13 may be stuck to the portion of the strip passing over the roll 15 to support such free end of the strip and its guiding means in and out of the way or inoperative position. In this operation the free end of the strip is caused to adhere by its rubber coating to the rubber coating of the portion of the strip lying upon the roller 15, whereby the parts may be supported in position without the use of auxiliary fastenings.

It will thus be seen that my invention provides a guiding means which relieves the operator from the work of guiding the fabric and at the same time tensioning it manually as he lays it upon the forming core and smooths it down over said core, and overcomes the inaccuracies and irregularities of action due to such manual operations. Hence it is not necessary to employ strips of excessive diameters to allow for such irregularities and subsequent trimming, as the guiding mechanism insures the accurate application of the fabric strip to the core at all times in a uniform manner, thus reducing or entirely eliminating the necessity of trimming and its consequent waste. It will also be seen that my invention provides a simple and effective means for controlling the movements of the carriage supporting the working tools, so as to reduce the amount of time and labor required in shifting the tools into and out of working position the number of times required in the building of the tire. By means of my improved machine a larger number of tires of a more uniform quality may be made by an operator within a given period than is possible by the instruments hitherto in use, and with a saving of expense in avoiding loss of time and material, as hereinbefore described.

While the structure shown is preferred, it will, of course, be understood that any other equivalent construction falling within the scope of the appended claims, may be employed without departing from the spirit or sacrificing any of the advantages of the invention.

Having described my invention, I claim:

1. In a tire building machine, the combination of a rotary core, fabric supply rolls, and universally movable fabric guiding means between the core and rolls.

2. In a tire building machine, the combination of a rotary core, fabric feeding rolls, and a vertically and laterally movable channeled guiding element between the core and rolls.

3. In a tire building machine, the combination of a rotary core, fabric feeding rolls, and a vertically movable and laterally tiltable channeled guiding element between the core and the rolls.

4. In a tire building machine, the combination of a rotary core, fabric supplying rolls, a vertically movable and laterally tiltable fabric guiding element between the rolls and core, and means for holding said element in guided relation to the surface of the core.

5. In a tire building machine, the combination of a rotary core, fabric supplying rolls, a guide member arranged between the core and rolls for supporting and guidingly engaging the lateral edges of a strip of fabric feeding from the rolls to the core, interconnected supports for said guide member, said supports being pivotally mounted for vertical and lateral swinging movements, and controlling devices for said supports engaging opposite sides of the forming surface of the core.

6. In a tire building machine, the combination of a rotary core, fabric supplying rolls, a guiding element disposed between the core and rolls and flexibly mounted for vertical and lateral movements, and controlling elements engaging the surface of the core on opposite sides of its center for adjusting said guiding element for feeding the strip of fabric to conform to the surface of the core.

7. In a tire building machine, the combination of a rotary core, fabric feeding rolls, and a universally movable channeled guide for the fabric arranged between the core and rolls.

8. In a tire building machine, the combination of a rotary core, fabric feeding rolls, and a channeled guide for the fabric between the core and rolls having angularly related portions hinged or pivoted for relative movements.

9. In a tire building machine, the combination of a rotary core, fabric supplying rolls, a channeled guide member arranged between the core and rolls for supporting and guidingly engaging the lateral edges of a strip of fabric feeding from the rolls to the core, interconnected supports for said guide member, said supports being pivotally mounted for vertical and lateral swinging movements, and controlling devices for said supports engaging opposite sides of the forming surface of the core.

10. In a tire building machine, the combination of a rotary core, fabric supplying rolls, a channeled fabric guide disposed between the core and rolls and comprising flexibly connected and angularly related sections, and means movably mounting said guide with relation to the surface of the core.

11. In a tire building machine, the combination of a rotary core, fabric feeding rolls, a flexibly supported channeled guide composed of longitudinally divided sections arranged between the core and rolls, said guide sections being adjustable to vary the width of the guide for different widths of fabric, and means for guiding said guide with relation to the surface of the core.

12. In a tire building machine, the combination of a rotary core, fabric supplying rolls, a guiding element between the core and rolls having angularly related portions and a bending roll about which the fabric passes in proximity to the said angularly related portions of the guiding element.

13. In a tire building machine, the combination of a rotary core, fabric supplying rolls, a channeled guide for the fabric disposed between the core and rolls, means for movably supporting said guide and centering the same with relation to the surface of the core, and a bending roller arranged for coöperation with the guide and yieldable therewith.

14. In a tire building machine, the combination of a rotary core, fabric supplying rolls, a channeled guide for the fabric disposed between the core and rolls, said guide having angularly related portions and having its channeled flanges cut away to form a receding space at the intersection of said portions, and a bending roll for changing the path of the fabric disposed for rotation in said space.

15. In a tire building machine, the combination of a rotary core, fabric supplying rolls, a channeled guide for the fabric passing from the rolls to the core, vertically movable frame arms, a bending roller journaled in said arms and arranged for coöperation with the channeled guide, arms universally jointed to the frame arms for vertical and lateral movements, a supporting connection between said arms and the channeled guide, and guiding elements carried by said arms for guiding contact with the surface of the core.

16. In a tire building machine, the combination of a rotary core, fabric supplying rolls, a channeled guide for the fabric in the line of feed of the fabric from the supplying rolls to the core, said guide comprising angularly related jointed sections, and a bending roller about which the fabric passes in proximity to the angle of intersection of said sections.

17. In a tire building machine, the combination of a rotary core, fabric supplying rolls, a channeled fabric guide arranged in line of feed of the fabric between the fabric supplying rolls and the rotary core, said guide comprising jointed sections arranged at an angle to each other, said sections having their channeled walls cut away adjacent to the joint to form a clearance space, and a bending roller arranged in proximity to said space and about which the fabric passes between the guide sections.

18. In a tire building machine, the combination of a rotary core, fabric supplying rolls, a guide arranged in the line of feed of the fabric between the supplying rolls and core, means supporting said guide for universal flexibility, and means running in contact with the surface of the core for adjusting the guide to feed the fabric in conformity with vertical and lateral deflections in the conformation of said surface.

19. In a tire building machine, the combination of a rotary core, fabric supplying rolls, a guide arranged in the line of feed of the fabric between the supplying rolls and core, vertically swinging frame arms, a bending roller extending transversely of the guide and carried by said frame arms, guide arms jointed to the frame arms and provided with guide rollers to engage the surfaces of the core on opposite sides of its center, and means supporting the guide from said guide arms.

20. In a tire building machine, the combination of a rotary core, fabric supplying rolls, vertically movable frame arms, a guide for the fabric composed of laterally adjustable sections, guide arms jointed to the frame arms for vertical and lateral movements, guide rollers carried by the guide arms and running in contact with the surface of the core, means for adjusting the guide arms and sections of the guide to vary the width of the guide and distance between the guide rollers, and a bending roller extending transversely of the guide and mounted upon the frame arms for movement in a direction transversely of the guide.

21. In a tire building machine, the combination of a forming core, fabric supplying means, a guide arranged in the line of feed of the fabric between the supplying means and core, means supporting said guide for vertical and lateral tilting movements, and means governed by the conformation of the surface of the core for vertically and laterally shifting the guide to feed the fabric in accordance therewith.

22. In a tire building machine, the combination of a forming core, fabric supplying means, a guide arranged in the line of feed of the fabric between the supplying means and the core, means supporting said guide for universal movements, and means running in contact with the surface of the core and controlled thereby for vertically and laterally adjusting the guide in the feed of the fabric to feed the fabric in accordance with the conformation of the surface of the core.

23. In a tire building machine, the combination of a forming core, fabric supplying means, a fabric swinging frame, a bending roller carried by said frame and movable laterally thereof, arms jointed to the frame for vertical and lateral swinging movements, a sectional guide disposed between said arms and composed of laterally adjustable sections, means for adjusting the arms and sections of the guide, and means carried by the arms and running in contact with the surface of the core for adjusting said arms and guide laterally and vertically according to the conformation of said surface.

24. In a tire building machine, the combination of a tire forming core, fabric supplying means, a bending roll, a vertically and laterally movable fabric guide disposed between said fabric supplying means and the core, said bending roll being rotatable on its axis and supported independently of the fabric guide but shiftable therewith laterally of the line of feed of the fabric, and controlling means for the guide running in contact with the surface of the core.

25. In a tire building machine, the combination of a tire forming core, fabric supplying means, a guide for conducting a strip of fabric from said supplying means to the surface of the core, said guide being flexibly mounted for universal adjustments to guide the fabric in accordance with variations in the conformation of the surface of the core, and controlling means for regulating the movements of the guide arranged to run in contact with the surface of the core.

26. In a tire building machine, the combination of a forming core, fabric supplying rolls, a fabric guide in the line of feed between the core and rolls, a support for the guide mounted for universal vertical and lateral movements, and controlling devices connected with said support and engaging the surfaces of the core for universally adjusting the support and guide to feed the fabric in conformity with variations in the conformation of the surface of the core.

27. In a tire building machine, the combination of a forming core, fabric supplying rolls, a vertically movable frame, a rotatable and laterally shifting bending roll carried by said frame, a fabric guide composed of angularly related parts arranged for coöperation with said roll and disposed in the line of feed of the fabric between the supply rolls and core, arms universally joined to the vertically movable frame on opposite sides of the guide, and rollers carried by said arms and engaging the sides of the surface of the core for adjusting the arms and guide to conform to variations in the conformation of the surface of the core.

In testimony whereof I affix my signature.

MARION B. WHEELER.